United States Patent [19]

Tidwell

[11] Patent Number: 5,516,179

[45] Date of Patent: May 14, 1996

[54] TRUCK BED SEAT

[76] Inventor: Billy J. Tidwell, 300 Thomas St., Lawrenceburg, Tenn. 38464

[21] Appl. No.: 340,637

[22] Filed: Nov. 16, 1994

[51] Int. Cl.⁶ ........................................ B60N 2/24
[52] U.S. Cl. .......................... 296/63; 296/64; 297/344.1; 297/452.39; 297/217.7
[58] Field of Search ............................ 296/63, 64, 65.1; 297/344.1, 452.39, 217.7; 248/354.5, 354.1, 172

[56]  References Cited

U.S. PATENT DOCUMENTS 5,029,928  7/1991  Huber ........................................ 296/63

5,139,301  8/1992  Lewis ........................................ 296/63

Primary Examiner—Joseph D. Pape

[57] ABSTRACT

A truck bed seat comprising a framework, wherein the framework includes spaced support posts, and the spaced support posts each include telescoping legs to permit ease of mounting of the framework within a truck bed, and a chair assembly slidably adjusted between the first support post and the second support post permitting ease of positioning of the chair assembly over a wheel well of an associated truck bed.

7 Claims, 4 Drawing Sheets

TRUCK BED SEAT

TECHNICAL FIELD

The field of invention relates to auxiliary seat structure and more particularly for use in truck assemblies, and more specifically to a new and improved truck bed seat arranged for mounting to an interior side wall of an associated truck bed.

BACKGROUND OF THE INVENTION

Prior art structure relating to the positioning of a seat within a truck bed is exemplified by U.S. Pat. No. 5,029,928, as well as U.S. Pat. Nos., 5,139,301; 3,840,263; 5,078,443; and 4,679,840.

SUMMARY OF THE INVENTION

The present invention relates to a truck bed seat arranged for ease of retrofit relative to an existing truck bed, such that the seat utilizes space above a wheel well within the truck bed to more efficiently utilize such space within a truck bed and to this end, support posts are arranged in a spaced relationship relative to one another and are retroactively and readily secured within the truck bed, with the seat structure arranged for ease of positioning onto the post structure.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
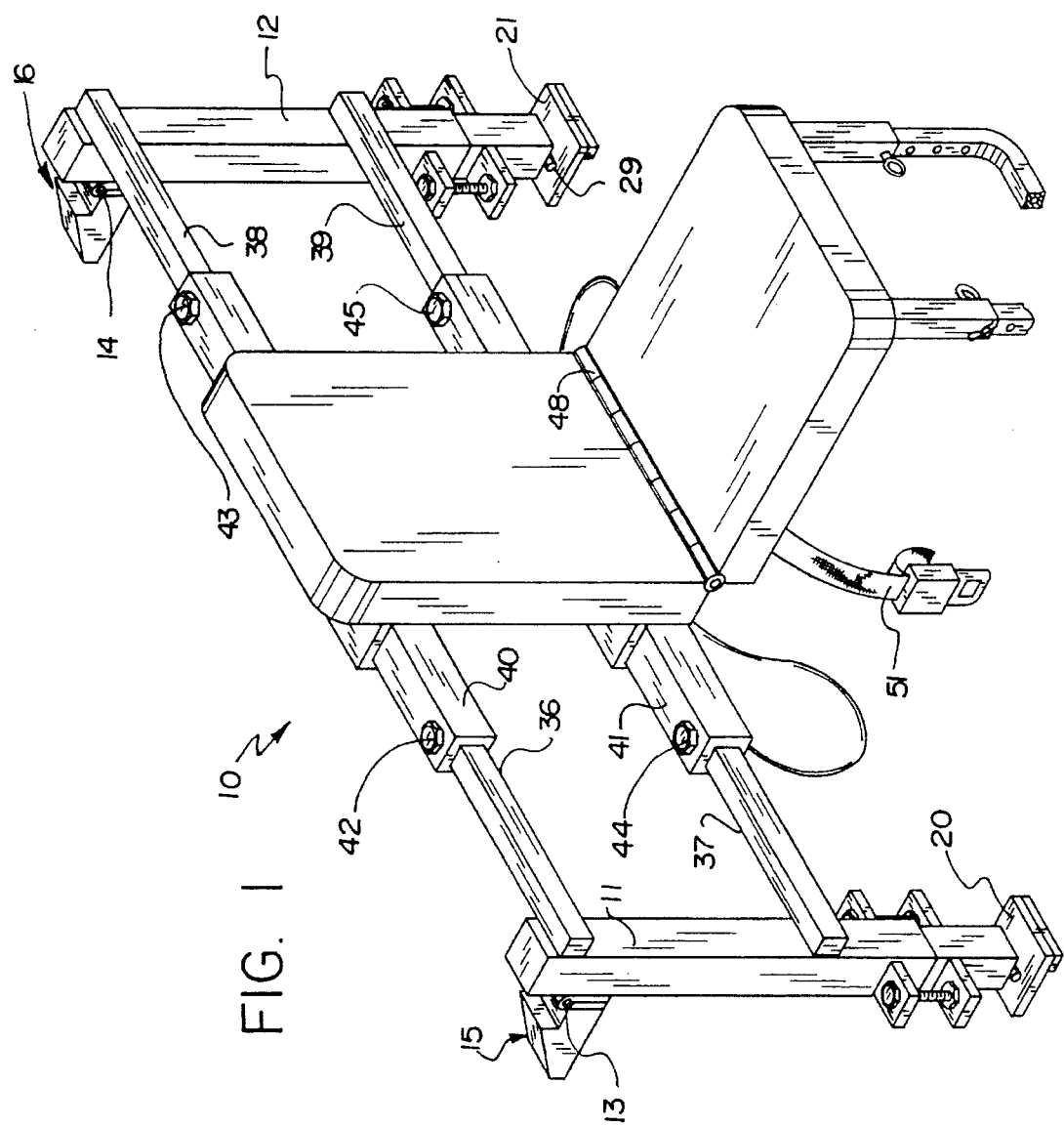
FIG. 1 is an isometric illustration of the invention.
Figure 2:
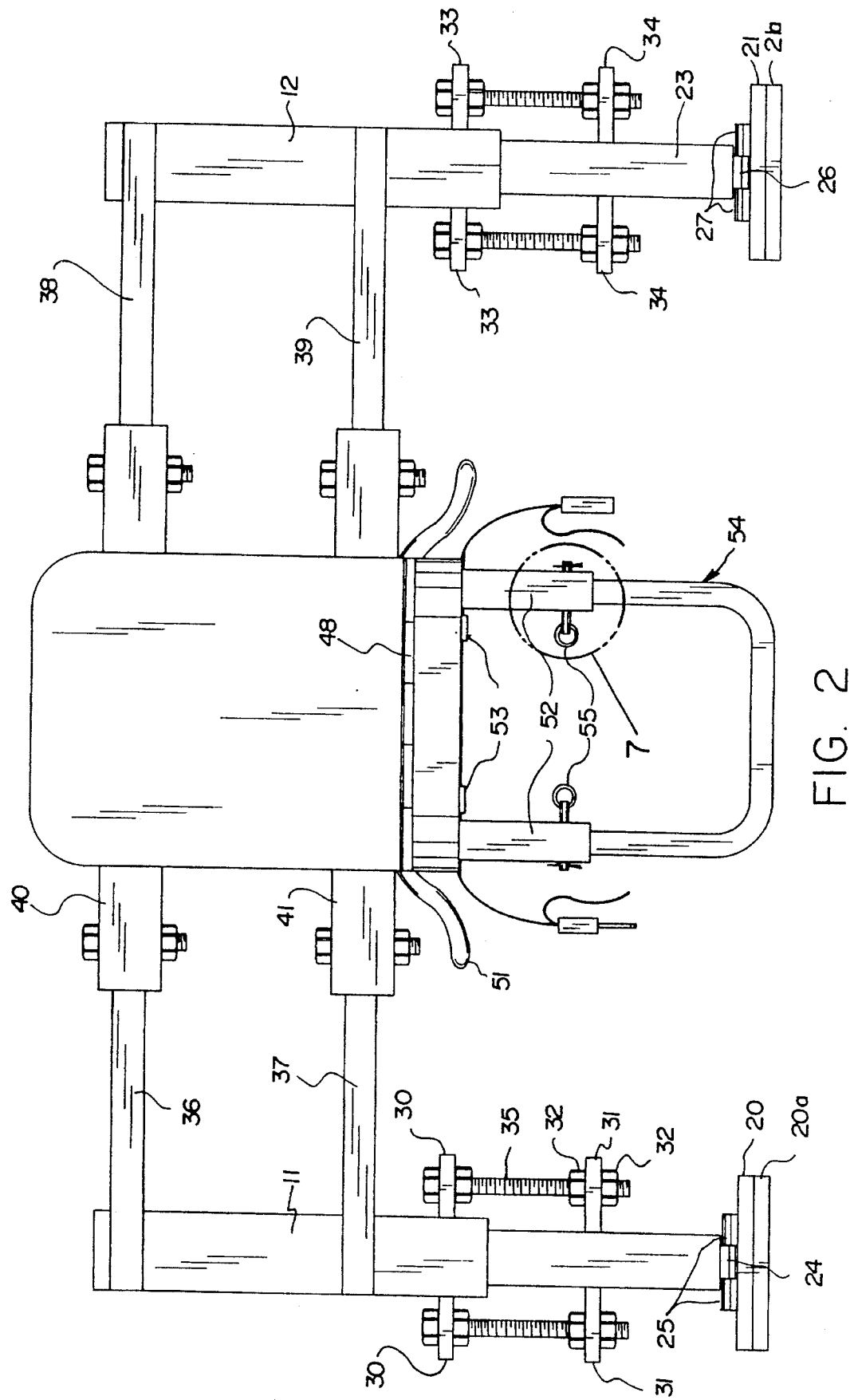
FIG. 2 is an orthographic view of the invention, taken in elevation.
Figure 3:
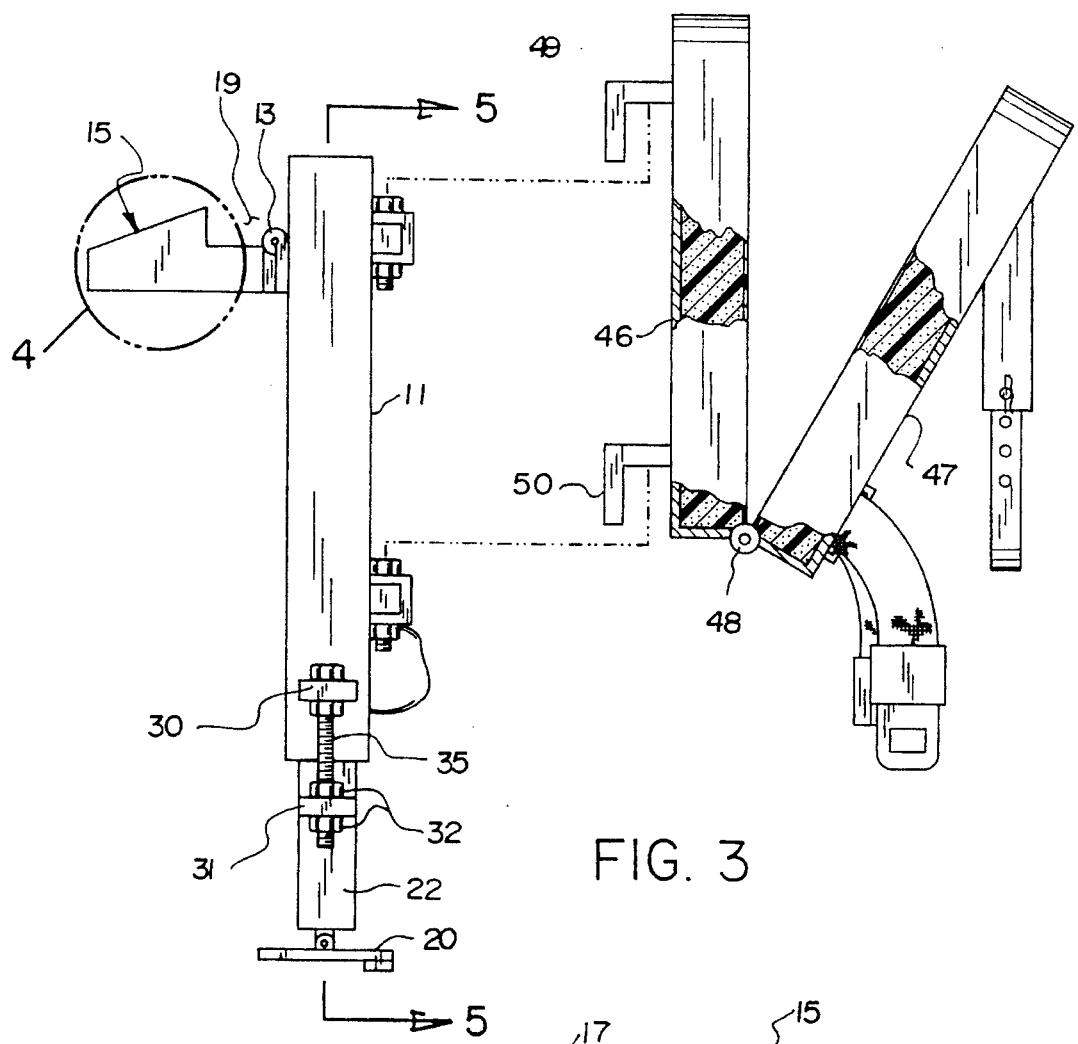
FIG. 3 is an orthographic side view of the invention indicating the seat member separated relative to the framework.
Figure 4:
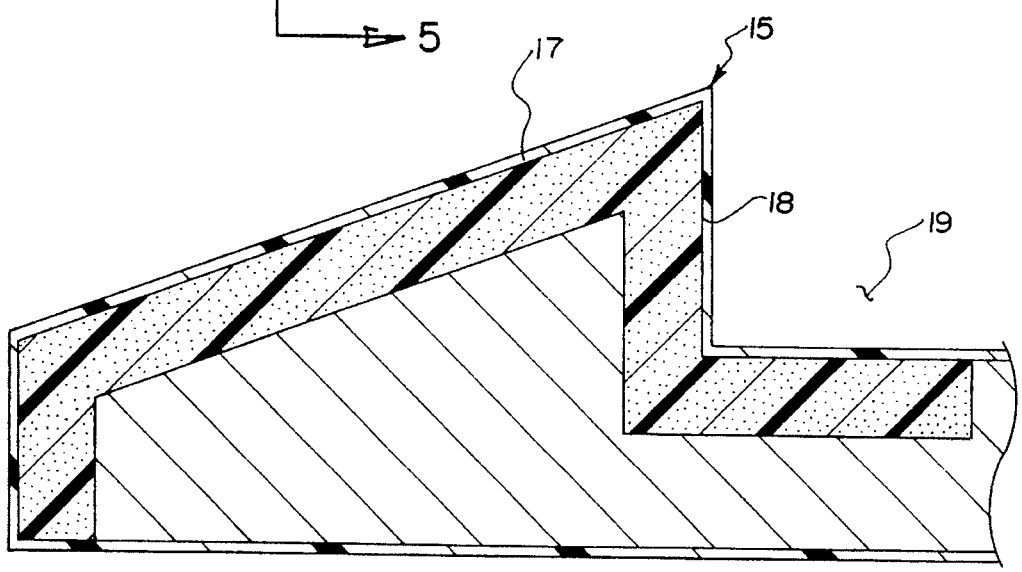
FIG. 4 is an enlarged, orthographic cross-sectional illustration of section 4 as set forth in FIG. 3.

The truck bed seat 10 of the invention, as indicated in FIG. 1, is arranged for mounting within a truck bed to engage an interior upper rail surface of the truck bed by the use of the first and second mounts 15 and 16 as illustrated and to engage the floor of the truck bed by the first and second base legs 20 and 21, such that the seat structure is arranged for positioning onto the slide bars 36–39. The support framework of the invention includes spaced first and second support posts 11 and 12, such that respective first and second hinges 13 and 14 are mounted to uppermost distal ends of the respective first and second support posts 11 and 12 or at least adjacent thereto, such that first and second mounts 15 and 16 respectively are pivotally secured to respective first and second support posts by the respective first and second hinges 13 and 14. Each of the first and second mounts 15 and 16 is formed with a padded top wall 17 and a padded abutment wall 18 that is in turn obliquely oriented relative to the top wall 17, with a recess 19 oriented between a respective abutment wall 18 and a support post to permit projection of the padded top wall 17 within a rail portion of a truck bed (not shown). First and second respective telescoping posts 22 and 23 are telescopingly received within the first and second support posts 11 and 12 respectively, with a first base plate 20 fixedly secured to a lowermost distal end of the first telescoping post 22 and a second base plate 21 secured to a lowermost distal end of the second telescoping post 23. The first base plate 20 having a first base plate cushion 20a, while the second base plate 21 having a second base plate cushion 21a for preventing marring and disfigurement of a truck bed floor receiving the base plates thereon. A first post lock tube fixedly secured to a lowermost distal end of the first telescoping post 22 is received between spaced first base plate lock tubes 25 that in turn are fixedly secured onto the first base plate 20, such that a first lock pin 28 is directed through the first post lock tube 24 and the spaced first base plate lock tube 25. A second post lock tube 28 fixedly secured to a lowermost distal end of the telescoping post 23 is received between spaced second base plate lock tubes 27 onto the second base plate 21, such that a second pin 29 is received through the second post lock tube 28 and the spaced second base plate lock tubes 27 for a generally pivoting relationship of the telescoping tubes relative to the base plates to accommodate various surface irregularities of a pickup truck bed floor.

A pair of first flanges 30 are integrally secured adjacent a lower distal end of the first support post 11, with each of the first flanges 30 and one of the second flanges 31 of the first telescoping post 22. Similarly, second post first flanges 33 are aligned with second post second flanges 34 of the second telescoping post 23. Each of the first and second flanges receives a fastener rod 35, such that a pair of fasteners 32 on each side of a second flange permits vertical adjustment of the telescoping post relative to a support post, as the associated fastener rod 35 is fixedly secured relative to a first flange such as 30 or 33 by use of fasteners, welding, or the like.

Fixedly secured to the first support post 11 and extending laterally thereof are respective first upper and lower respective slide bars 36 and 37 arranged in a parallel relationship, with second upper and lower slide bars 38 and 39 fixedly secured to the second support post. The slide bars 36 and 38 are colinearly aligned as are the slide bars 37 and 39, such that a first tube 40 receives at its opposed ends the first and second upper slide bars 36 and 38, with a second tube 41 receiving at its opposed ends within the second tube the first and second lower slide bars 37 and 39. First tube first and second pins 42 and 43 adjustably are secured to the slide bars 36 and 38, while second tube first and second pins 44 and 45 are secured to the respective slide bars 37 and 39 in a manner as indicated in FIG. 6, as it is noted that each of the slide bars includes a row of bores directed therethrough for adjustable reception within a respective tube structure.

The seat assembly of the invention includes a chair back 46 hingedly mounted to a chair seat 47 about a chair hinge 48, with respective first and second mounting flanges 49 and 50 mounted to a rear wall of the chair back 46 utilizing welding or mechanical fastening, or merely positioning upon the first and second tubes 40 and 41. Further and for purposes of safety, a seat belt assembly 51 is mounted to the chair assembly and as illustrated, to the chair seat 47.

Figures 5, 6, 7:
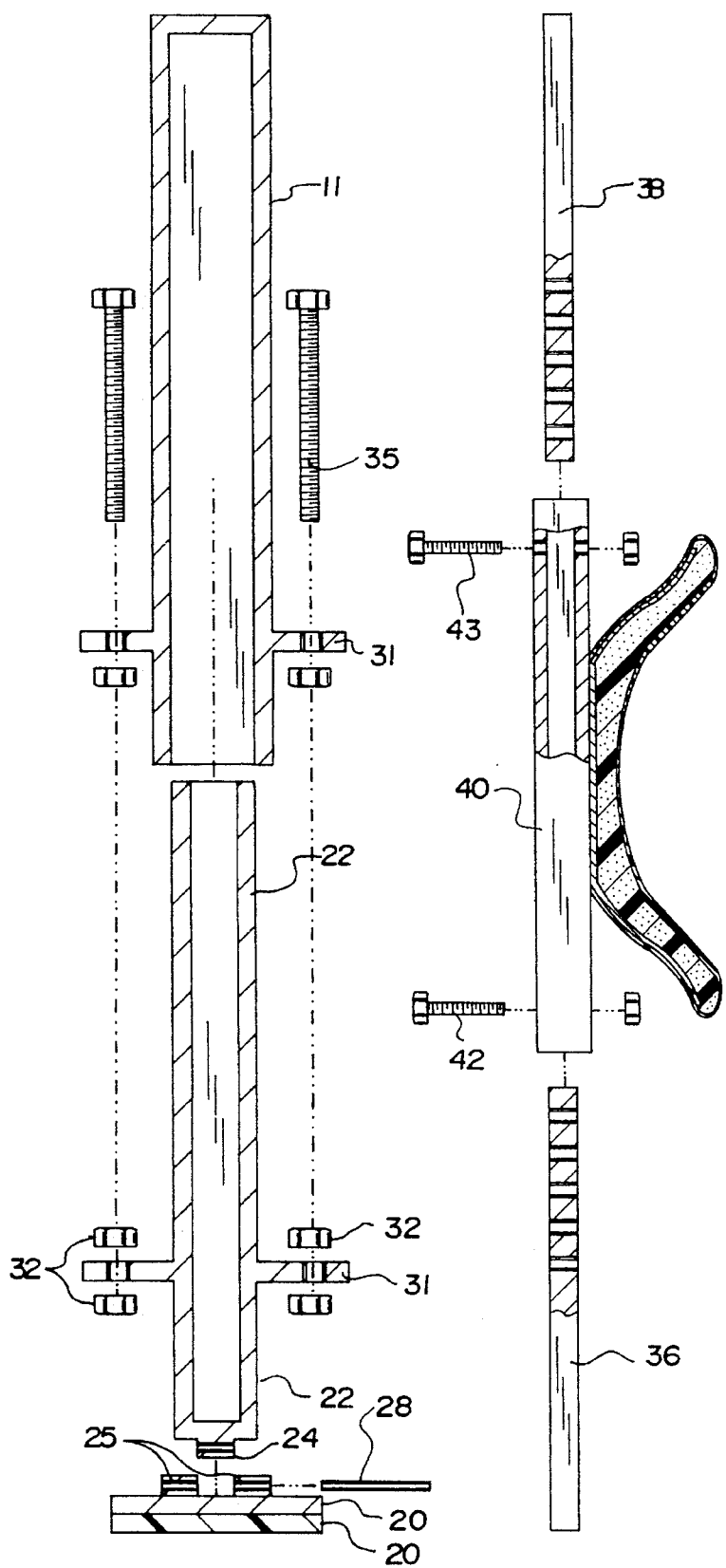
FIG. 5 is a cross-sectional illustration taken on the lines 5—5 of FIG. 3 in the direction indicated by the arrows.
FIG. 6 is an orthographic view of the slide bars arranged for mounting the seat structure.
FIG. 7 is an enlarged, orthographic cross-sectional illustration of section 7 as set forth in FIG. 2.

Seat tubes 52 are hingedly mounted to a bottom wall of the chair seat about a seat tube hinge 53, with the seat tubes 52 arranged in a parallel relationship to receive opposed legs of a seat support yoke 54 that is telescopingly received within the seat tubes 52 by yoke pins 55, in a manner as illustrated in FIG. 7.

It should be understood that the seat construction of the invention may be further modified to employ a plurality such as two or even three seats mounted upon the framework 37, 38, etc., as indicated in FIG. 1. To this end, the mere lengthening of the members 37, 38 will permit the additional seats, be they one, two, three, or more, mounted between the side walls of the truck bed. Further, it should be understood that in the utilization of the invention the seat belt structure 51 may be readily employed to secure the seat in a folded configuration relative to the structural elements 36, 37, 38 and 39 by merely looping the seat belt around the tubes as noted to secure the seat in a folded and stored relationship. It should be understood also that various quick release pins and the like may be employed to the mounting and dismounting of the seat structure relative to the framework if so desired. The preferred embodiment as illustrated is for purpose of example and it should be understood that various modifications may be employed, as noted.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A truck bed seat, comprising, a framework, including a first support post spaced from a second support post, with the first support post telescopingly receiving a first telescoping post, and the second support post telescopingly receiving a second telescoping post, with first adjustment means for adjustably positioning the first telescoping posts relative to the first support post, and second adjustment means for adjustably positioning the second telescoping post relative to the second support post, and the first support post having a first upper slide bar and a first lower slide bar extending laterally from the first support post, and the second support post having a second upper slide bar colinear with the first upper slide bar, and a second lower slide bar secured to the second support post colinear with the first lower slide bar, and a seat assembly, the seat assembly adjustably secured to the first upper slide bar, the first lower slide bar, the second upper slide bar, and the second lower slide bar.

2. A truck bed seat as set forth in claim 1 wherein the seat assembly includes a first tube, with the first tube having a first tube first end and a first tube second end, the first tube first end adjustably receiving the first upper slide bar, and the first tube second end adjustably receiving the second upper slide bar, with a second tube secured to the seat assembly, with the second tube having a second tube first end and a second tube second end, the second tube first end slidably receiving the first lower slide bar, the second tube second end slidably receiving the second lower slide bar.

3. A truck bed seat as set forth in claim 2 wherein the first adjustment means includes first flanges fixedly secured to the first support post, and second flanges fixedly secured to the first telescoping post, with one of said first flanges and one of said second flanges arranged in a parallel facing relationship, with one of said first flanges and one of said second flanges defining a flange pair, with each said flange pair having a fastener rod directed therethrough, with the fastener rod secured to the flange pair and further including spaced fasteners on opposed sides of the second flanges for adjustably securing the fastener rod relative to the fastener pair.

4. A truck bed seat as set forth in claim 3 wherein the seat assembly includes a seat back, and the seat back having a first mounting flange arranged for receiving the first tube, and a second flange secured to the seat back arranged for receiving the second tube.

5. A truck bed seat as set forth in claim 4 wherein the seat assembly includes a chair seat, and the chair seat having a chair hinge pivotally mounting the chair seat to the chair back.

6. A truck bed seat as set forth in claim 1 wherein the first support post includes a first mount pivotally mounted to the first support post, and a second mount pivotally mounted to the second support post, with the first mount and the second mount each having a padded top wall and a padded abutment wall, wherein the first mount having a first recess spaced from the first hinge, and the second mount having a second recess spaced from the second hinge permitting projection of the first mount and the second mount into a truck bed side wall rail.

7. A truck bed seat as set forth in claim 6 wherein the chair seat includes spaced seat tubes, with the seat tubes hingedly mounted to the chair seat, with a seat support yoke having spaced yoke legs, with each said yoke legs received within one of said seat tubes, with yoke pins adjustably securing the seat support yoke relative to the seat tubes.

* * * * *